Aug. 15, 1967  C. C. CARSE  3,336,053
PRESSURE RELEASE FITTING
Filed July 31, 1964

INVENTOR.
CLIFFORD C. CARSE
BY *Naylor & Neal*
ATTORNEYS

United States Patent Office 3,336,053
Patented Aug. 15, 1967

3,336,053
PRESSURE RELEASE FITTING
Clifford C. Carse, Sun Valley, Calif., assignor to Bar-Master, Inc., Los Angeles, Calif., a corporation of California
Filed July 31, 1964, Ser. No. 386,585
2 Claims. (Cl. 285—1)

This invention relates to a pressure release fitting and more particularly is directed to a pressure release mechanism incorporated in a quick release coupling. The fitting is especially suited for introducing gas under pressure into tanks, such a pressurized $CO_2$ into carbonated beverage tanks.

The prior art teaches, individually, both quick release couplings and pressure release fittings. Furthermore, the utilization of both of these devices on a single tank of fluid under pressure is considered an obvious expedient. The combined use of the individual devices in this way is not, however, without some disadvantages. Specifically, when using such devices in combination on a single tank, their bulk often makes the tank unwieldy. Furthermore, the use of the two devices in combination frequently requires that two openings be formed in the tank, thus weakening the tank and increasing the cost of the installation.

In addition to the above enumerated relatively apparent disadvantages, another disadvantage that results from the use of individual pressure release fittings and quick release couplings in combination is that considerable gas loss occurs upon activation of the pressure release fitting. This loss results because the quick release coupling remains connected to the tank being pressurized even after the fitting has released pressure from the tank. Thus, if the quick release coupling is being used to fill a tank from a prime source, such as a large $CO_2$ Dewar, it is likely that much of the $CO_2$ in the Dewar will be exhausted through the pressure release fitting and wasted before the time an operator is able to turn off the Dewar. In addition to the waste that results in the latter occurrence, the escape of excessive $CO_2$ under pressure also presents a hazard with respect to injury of the operator and damage to surrounding equipment. This hazard is particularly acute where $CO_2$ is being used to carbonize beverages behind confined bars or fountains.

It is, accordingly, a principal object of the present invention to provide a fitting combining a pressure release mechanism and quick release coupling to overcome disadvantages of the type enumerated above.

Another and more specific object of the invention is to provide a pressure release mechanism which is adapted to be incorporated in a quick release coupling of a relatively conventional nature.

Yet another object of the invention is to provide a pressure release mechanism which functions by releasing a conduit coupling.

The pressure release mechanism of the present invention is used in combination with a coupling comprising: a male member having a passage therethrough; a female member having a passage therethrough, which member is adapted to mate with the male member to establish sealed fluid communication between the respective passages; and cooperating detent elements to lock the respective members in mated condition. Broadly, the pressure release mechanism of the invention comprises a structure adapted to release the detent elements responsive to excessive pressure in the passages of the coupling members. The basic mechanism includes an expansible chamber on one of the members in fluid communication with the passage therethrough; means restraining expansion of the chamber when the coupling members are in mated condition until a predetermined pressure within the chamber is reached; and means operatively associated with both chamber and detent structure to release the structure upon expansion of the chamber.

The foregoing and other objects and the structure and operation of the invention will be more apparent when viewed in light of the following detailed description and accompanying drawings, wherein.

Figure 2:
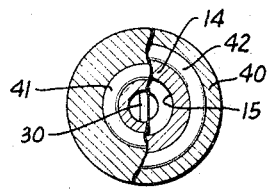
FIG. 2 is a sectional view taken on line 2—2 of FIG. 1.
Figure 1:
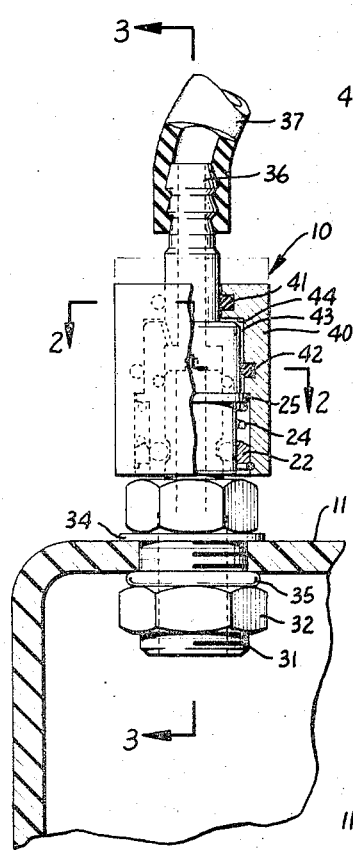
FIG. 1 is an elevational view, partially in section, illustrating one embodiment of the invention in coupled condition.
Figure 3:
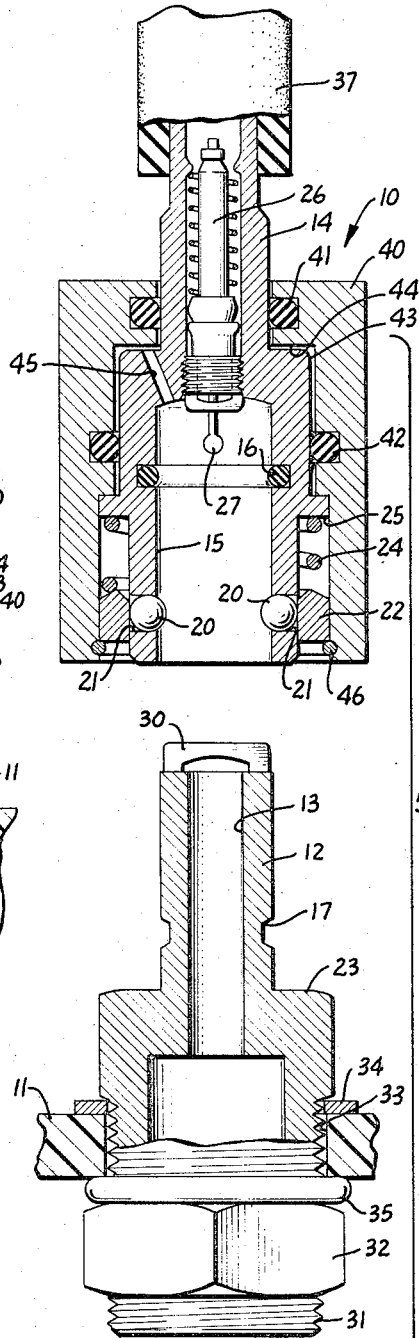
FIG. 3 is a sectional view taken on line 3—3 of FIG. 1 and showing the embodiment thereof in uncoupled condition.

Referring now to FIGS. 1 to 3, the pressure release fitting therein is designated in its entirety by the numeral 10 and is shown mounted on a tank 11, such as might be used for carbonated beverages. The coupling of the fitting is divided into two separable elements comprising a male member 12 having a passage 13 therethrough and a female member 14 having a passage 15 therethrough. The male member 12 is adapted to seat in mated engagement in the passage 15, as illustrated in FIG. 1, to establish fluid communication between the passages 13 and 15. In the mated condition, sealed communication is assured through means of an O-ring 16 disposed in the passage 15 so as to sealingly engage the outer periphery of the member 12.

The members 12 and 14 are locked in mated condition through a selectively operable detent structure comprising: an annular groove or abutment 17 formed around the member 12; a plurality of balls 20 received in tapered openings 21 in the member 14 for limited extension into the passage 15; and an actuator sleeve 22 received around the member 14 for slidable movement between positions either forcing the balls 20 into extended condition in the passage 15 or permitting the balls to assume a retracted position out of the passage 15. The members 12 and 14 are so proportioned that the balls 20 assume a position directly opposed to the groove 17 when said members are in mated condition (see FIG. 1). This interrelationship is assured by a shoulder 23 which is adapted to abut against the lower surface of the member 14 when said member is fully mated on the member 12. Thus, when the members 12 and 14 are in mated condition, movement of the sleeve 22 to juxtaposition with respect to the balls 20 functions to force said balls into the groove 17 and lock the members together. Likewise, moving the sleeve 22 to a position above the balls 20 functions to release the balls from the groove 17 and thus release the members for separation. A spring 24 is interposed between the sleeve 22 and a collar 25 formed on the member 14 to normally urge the collar to a position extending the balls 20 (see FIG. 3). From the subsequent discussion it will be seen that the sleeve 22 and spring 24 perform additional functions in the pressure release operation of the coupling.

The interior structure of the coupling member 12 and 14 is completed by a valve arrangement which functions to close the passage 15 upon uncoupling of the members. This arrangement comprises: a valve 26 threadably received in the passage 15 and having an actuator 27 extending downwardly therefrom; and a bar 30 fixed to the member 12 in a position wherein it will engage and move the actuator 27 upon mating engagement of the members 12 and 14. The valve 26 is of conventional character and corresponds both in structure and operation to that used in conventional pneumatic tires.

The basic coupling structure thus far described is of relatively conventional character and corresponds closely to that of prior art devices. The conventional structure of the coupling is completed by provision to facilitate the connection of the respective coupling members in the environment illustrated. On the member 12 this provision includes a threaded section 31 below the shoulder 23 which is adapted to receive a nut 32 to clamp said section to an opening 33 in the tank 11. A washer 34 and O-ring 35 are provided on opposite sides of the tank 11 to assure fixed and sealed engagement between the tank and the member 12. The connection provision on the member 14 simply comprises a tapered portion 36 of stepped configuration which is adapted to be snugly received in the opening of a conventional resilient hose 37. In the installation illustrated, the hose 37 extends to a storage Dewar (not illustrated) containing $CO_2$ under pressure.

In the embodiment of the invention illustrated in FIGS. 1 to 3, the pressure responsive release mechanism to which the invention is primarily directed basically comprises an expansible chamber on the member 14 in fluid communication with the passage 15. The chamber is defined by: the outer cylindrical surface of the member 14; a sleeve 40 slidably received around said surface; and a pair of spaced O-rings 41 and 42 received in said sleeve and sealingly engaging said outer surface. The chamber so defined is expansible because the outer surface of the member 14 and the inner surface of the sleeve 40 are provided with opposed stepped sections 43 and 44, respectively, which define an increasing volume therebetween when the sleeve slides upwardly with respect to the member (as viewed in FIG. 3). Fluid communication between the passage 15 in the chamber is established by a duct 45. Thus, pressure within the passage 15 is transmitted to the chamber and tends to expand the chamber through lifting of the sleeve 40 with respect to the member 14.

The lower end of the sleeve 40 is provided with an extension which carries a snap ring 46 in abutting relationship with the underside of the sleeve 22. Thus, the resilient force of the spring 24 is transmitted to the sleeve 40 through means of the sleeve 22 and snap ring 46 and the spring, in effect, functions as a means to restrain expansion of the chamber. Therefore, by selecting the characteristics of the spring 24 the pressure required to raise the sleeve 40 and expand the chamber defined thereby can be controlled.

In operation the aforedescribed structure can be moved between the coupled and uncoupled conditions simply by manually raising the sleeve 40, which in turn raises the actuator sleeve 22 and releases the balls 20. Release of the coupling is automatically effected when the pressure within the passage 15 becomes sufficient to raise the sleeve 40. On the latter occurrence, the balls 20 are released from the groove 17 and the pressure within the passages 13 and 15 functions to separate the members 12 and 14. At the same time, the valve 26 closes the passage 15 and prevents the escape of gas from the hose 37.

Figure 5:
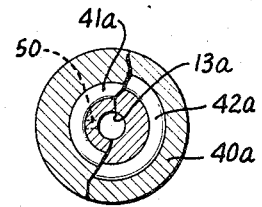
FIG. 5 is a sectional view taken on line 5—5 of FIG. 4.
Figure 4:
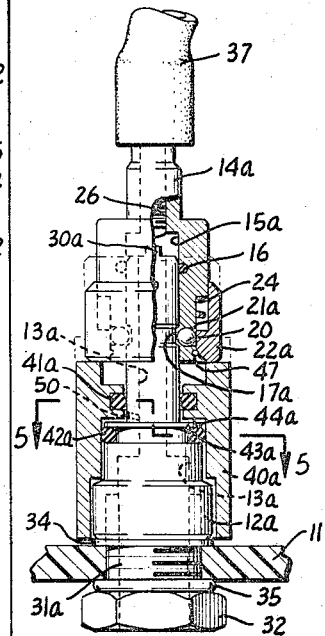
FIG. 4 is an elevational view, partially in section, illustrating an alternative embodiment of the invention in coupled condition.

Referring now to FIGS. 4 and 5, therein is illustrated a pressure release fitting differing from that described with reference to FIGS. 1 to 3 only in that modifications have been made to mount the chamber of the pressure release mechanism on the male coupling member rather than the female coupling member. In the subsequent discussion, elements in the FIG. 4 and FIG. 5 embodiment corresponding identically to those of the previously described embodiment of FIGS. 1 to 3 will be identified by corresponding numbers. Elements modified will be designated by like numerals carrying the subscript $a$.

The female coupling member 14a differs from the member 14 only in that it is provided with a snap ring 47 around the lower periphery thereof and that no duct, such as the duct 45, is formed therethrough. A passage 15a in the member 14a cooperates with an O-ring 16 and valve 26 in a manner corresponding identically to that in which the latter elements cooperated with the passage 15. Likewise, openings 21a in the member 14a receives balls 20 in a manner corresponding to that in which the balls are received in the openings 21. A sleeve 22a is slidably received on the member 14a to selectively actuate the balls 20 therein in a manner corresponding in operation to that of the sleeve 22. The sleeve 22a differs from the sleeve 22 in construction in that it is sufficiently long to house the spring 24 and has a lower edge portion formed to abut against the snap ring 47.

The male member in FIG. 4 is designated by the numeral 12a and corresponds to the member 12 in that it is adapted to seat in the passage 15a and includes a passage 13a, a groove 17a and a bar 30a, all of which function as the corresponding elements on the member 12. A threaded section 31a on the member 12a, corresponding to the section 31, functions to mount the member on the tank 11 through a nut 32, washer 34 and O-ring 35.

An expansible chamber, similar to the expansible chamber provided on the aforedescribed member 14, is provided on the member 12a. This chamber is defined by: the outer surface of the member 12a; a sleeve 40a slidably received around said outer surface; and spaced O-rings 41a and 42a sealingly interposed between said surface and sleeve. It is noted that the O-ring 41a is similar to the O-ring 41 in that it is carried by the sleeve 40a whereas the O-ring 42a differs from the O-ring 42 in that it is carried by the member 12a. Stepped sections 43a and 44a on the member 12a and sleeve 40a, respectively, accommodate expansion of the chamber upon movement of the sleeve upwardly with respect to the member (as viewed in FIG. 4). To provide for expansion of the chamber defined between the member 12a and sleeve 40a responsive to pressure within the passage 13a, a duct 50 is provided between said passage and chamber.

From the foregoing description, it is believed apparent that the operation of the FIGS. 4 and 5 embodiment of the invention corresponds closely to the operation of the FIGS. 1 to 3 embodiment. Specifically, when the members 12a and 14a are in the locked mated condition illustrated, their release can be accomplished by lifting of the sleeve 22a either manually or through pressure responsive expansion of the chamber on the male member 12a. The latter lifting results when the chamber expands, thus raising of the sleeve 40a with respect to the member 12a. This raising functions to force the extension on the upper end of the sleeve 40a into abutting engagement with the lower edge of the sleeve 22a, thus moving the sleeve 22a to a position releasing the balls 20.

To conclude, from the foregoing description it is believed apparent that the present invention enables the accomplishment of the objects initially set forth herein. In particular, a pressure responsive release mechanism is provided for use with a quick release coupling, which mechanism results in utilizing of the coupling as both a manually operable quick release device and an automatically operable pressure release valve. It is to be understood, however, that the invention is not intended to be limited to the specific embodiments illustrated and described, but rather defined by the following claims.

I claim:
1. In a quick release coupling, comprising:
 (A) a male member having a passage therethrough;
 (B) a female member having a passage therethrough, said member being adapted to mate with said male member to establish sealed fluid communication between said respective passages;
 (C) a detent abutment formed on said male member;
 (D) extensible detents carried by said female member and adapted to engage said abutment to lock said members in mated condition; and

(E) a detent actuator mounted on said female member for selective movement between positions, when said members are in mated condition, forcing said detents into engagement with said abutment, or releasing said detents from engagement with said abutment;

a pressure responsive release mechanism for said detent actuator, comprising:
(a) a expansible chamber formed on one of said members in fluid communication with the passage therethrough;
(b) means restraining expansion of said chamber, when said members are in mated condition, until a predetermined pressure is reached therein; and,
(c) release means operatively associated with said chamber and detent actuator to move said actuator to a position releasing said detents from engagement with said abutment upon expansion of said chamber,
(d) said chamber being defined by:
(1) the outer surface of said male member;
(2) the inner surface of a sleeve received around said male member for rectilinear movement therealong; and,
(3) the opposed surfaces of a pair of spaced seals interposed between said outer and inner surfaces;
(e) rectilinear movement of said sleeve in one direction with respect to said male member functioning to expand said chamber;
(f) said chamber being in fluid communication with the passage of said male member through a duct in said member; and,
(g) said release means comprising an extension on said sleeve engaging said detent actuator, when said members are in mated condition, which extension is adapted to move said actuator to the position releasing said detents upon rectilinear movement of said sleeve in said one direction.

2. A release mechanism according to claim 1 wherein said means restraining expansion of said chamber comprises a spring interposed between said actuator and female member to bias said actuator against said extension, when said members are in mated condition, and resiliently restrain rectilinear movement of said sleeve in said one direction.

References Cited
UNITED STATES PATENTS

| | | | |
|---|---|---|---|
| 2,921,436 | 1/7960 | Canner | 137—614.04 XR |
| 2,921,802 | 1/1960 | Canner | 287—277 XR |
| 3,132,667 | 5/1964 | Baker | 137—614.05 XR |
| 3,216,466 | 11/1965 | Simke | 141—226 |

WILLIAM F. O'DEA, *Primary Examiner.*

H. W. WEAKLEY, *Examiner.*